United States Patent
Zhou (10) Patent No.: US 9,515,907 B2
(45) Date of Patent: Dec. 6, 2016

(54) MONITORING METHOD OF MONITORING MODULE

(71) Applicants: Inventec (Pudong) Technology Corporation, Shanghai (CN); INVENTEC CORPORATION, Taipei (TW)

(72) Inventor: Chun-Peng Zhou, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 203 days.

(21) Appl. No.: 14/335,990

(22) Filed: Jul. 21, 2014

(65) Prior Publication Data

US 2015/0263929 A1 Sep. 17, 2015

(30) Foreign Application Priority Data

Mar. 13, 2014 (CN) .......................... 2014 1 0091040

(51) Int. Cl.
G06F 15/16 (2006.01)
G06F 15/173 (2006.01)
H04L 12/26 (2006.01)

(52) U.S. Cl.
CPC ................................. *H04L 43/0817* (2013.01)

(58) Field of Classification Search
CPC .. H04L 67/42; H04L 67/4002; H04L 67/1097; H04L 43/04; H04L 43/06; H04L 43/10; H04L 43/045; H04L 43/0817; H04L 41/22; H06F 1/26; H06F 1/32; H06F 1/266; H06F 1/329; H06F 1/3203; H06F 1/3215; H06F 1/3287; H06F 1/3296; G06F 11/30; G06F 11/202; G06F 11/328; G06F 11/3006; G06F 11/3048; G06F 11/3055; G06F 11/3062; G06F 11/3409
USPC .......................... 709/203, 217–219, 223–224
See application file for complete search history.

(56) References Cited

U.S. PATENT DOCUMENTS

2006/0203740 A1* 9/2006 Chang ................. G06F 11/0745
370/252
2010/0161704 A1* 6/2010 Arimilli ............ H04L 12/40013
709/202
2011/0066871 A1* 3/2011 Farmer ................... G06F 1/263
713/340

(Continued)

FOREIGN PATENT DOCUMENTS

TW 576977 B 2/2004
TW 201405303 A 2/2014

*Primary Examiner* — Farzana Huq
(74) *Attorney, Agent, or Firm* — CKC & Partners Co., Ltd.

(57) ABSTRACT

A monitoring method of a monitoring module is applied to a server. The server includes the monitoring module and a system. The monitoring module receives a status message from the system every monitoring time interval, and the status message reflects a status of the system. When the status message received by the monitoring module is OFF status message, the monitoring chip records the status of the system as ON status and starts counting. When a number of the monitoring module counting does not reach to a designated number, the monitoring chip records the status of the system as ON status. When the number of the monitoring chip counting reaches to the designated number, the monitoring chip records the status of the system as OFF status.

16 Claims, 4 Drawing Sheets

(56) References Cited

U.S. PATENT DOCUMENTS

| | | | | |
|---|---|---|---|---|
| 2012/0144223 A1* | 6/2012 | Kasahara | ............... | G06F 1/30 |
| | | | | 713/340 |
| 2013/0080840 A1* | 3/2013 | Baba | ............... | G06F 11/3006 |
| | | | | 714/47.1 |
| 2013/0185582 A1* | 7/2013 | Tsukamoto | ......... | G06F 3/0625 |
| | | | | 713/340 |
| 2014/0032978 A1* | 1/2014 | Huang | ............. | G06F 11/3409 |
| | | | | 714/47.2 |

* cited by examiner

MONITORING METHOD OF MONITORING MODULE

RELATED APPLICATIONS

This application claims priority to Chinese Application Serial Number 201410091040.1, filed Mar. 13, 2014, which is herein incorporated by reference.

BACKGROUND

Field of Invention

The present invention relates to a monitoring method. More particularly, the present invention relates to a monitoring method of a monitoring module.

Description of Related Art

In a general electronic device (e.g., a computer or a sever), a monitoring module monitors a system and immediately records a current state of the system that is operated or powered off. When a power source of the system is directly removed but not in a normal power-off procedure, the system is immediately powered down. However, since the speed of the monitoring module being powered down is much slower than the speed of the system being powered down, the monitoring module can still record the state of the system as OFF state when the state of the system is OFF state. As a result, the power restore policy is affected so that after the power is ON, the system can not be powered on automatically to be recovered to the ON state.

Therefore, it is one of the important subjects and the objective that how the power restore policy is not affected when the power source of the system is directly removed.

SUMMARY

A monitoring method of a monitoring module is provided to resolve the problems encountered in the prior art.

According to an embodiment of the present invention, a monitoring method of a monitoring module which is applied to a server that comprises the monitoring module and a system. The monitoring method comprises: receiving, by the monitoring module, a state message from the system every monitoring time interval, wherein the state message is configured to reflect a state of the system; recording the state of the system as ON state when a number of the monitoring module continuously receiving the state message reflecting the state of the system as OFF state does not reach a designated number; and recording the state of the system as OFF state when the number of the monitoring module continuously receiving the state message reflecting the state of the system as OFF state reaches the designated number.

In an embodiment, the monitoring module further comprises: recording the state of the system as ON state when the state message received by the monitoring module reflects the state of the system as ON state.

In an embodiment, the monitoring module is a baseboard management controller (BMC).

In an embodiment, the system is a motherboard system, and the motherboard system comprises a central processing unit (CPU) disposed on a motherboard, and a plurality of memories coupled to the CPU.

In an embodiment, the monitoring module receives the state message through an interface of the system.

In above embodiment, the interface is a general purpose I/O (GPIO) interface.

In an embodiment, the monitoring time interval is 25 ms, and the designated number is 160.

According to an embodiment of the present invention, a monitoring method of a monitoring module which is applied to a server that comprises the monitoring module and a system. The monitoring method comprises: the monitoring module receiving a state message from the system every monitoring time interval, wherein the state message is configured to reflect a state of the system; recording the state of the system as ON state and starting counting when the state message received by the monitoring module is a OFF state message; recording the state of the system as ON state when a number of the monitoring module counting continuously receiving the OFF state message does not reach a designated number; and recording the state of the system as OFF state when the number of the monitoring module counting continuously receiving the OFF state message reaches the designated number.

According to an embodiment of the present invention; a monitoring method of a monitoring module which is applied to a server that comprises the monitoring module and a system. The monitoring method comprises: receiving, the monitoring module, a state message from the system every monitoring time interval and recording a state of the system; recording the state of the system as ON state when a duration of the monitoring module continuously receiving the state message reflecting the state of the system as OFF state does not reach a designated duration; and recording the state of the system as OFF state when the duration of the monitoring module continuously receiving the state message reflecting the state of the system as OFF state has reaches the designated duration.

In above embodiment, the monitoring time interval is 25 ms, and the designated duration is 4 s.

According to an embodiment of the present invention, a monitoring method of a monitoring module which is applied to a server that comprises the monitoring module and a system. The monitoring method comprises: checking, by the monitoring module, a state of the system every monitoring time interval, wherein the state message is configured to reflect a state of the system; recording the state of the system as ON state when a number of the monitoring module continuously finding that the system is in OFF state does not reach a designated number; and recording the state of the system as OFF state when the number of the monitoring module continuously finding that the system is in OFF state reaches the designated number.

In an embodiment, the monitoring module further comprises: recording the state of the system as ON state when the state message received by the monitoring module reflects the state of the system as ON state.

In an embodiment, the monitoring module is a baseboard management controller (BMC).

In an embodiment, the system is a motherboard system, and the motherboard system comprises a central processing unit (CPU) disposed on a motherboard, and a plurality of memories coupled to the CPU.

In an embodiment, the monitoring module receives the state message through an interface of the system.

In above embodiment, the interface is a general purpose I/O (GM) interface.

In an embodiment, the monitoring time interval is 25 ms, and the designated number is 160.

In summary, the present invention has significant advantages and higher performance over current technology. With the present invention, significant technological improvements are realized, and the present invention may be widely used and implemented in industry. The advantages of the present invention is that the power restore policy is not affected when the system powers off abnormally. After the power supply is recovered, the system may automatically be recovered to the ON state.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts. In addition, well-known components and steps are not described in the embodiments to avoid unnecessary limitations to the present invention.

A monitoring method of a monitoring module of the present invention is applied to a server (e.g., a database server, a application server, a file server). The server comprises the monitoring module and a system. The system may be a motherboard system, and the motherboard system includes a motherboard, a central processing unit (CPU), a power controller, a display card a sound card, a chipset composed of a south bridge chip and a north bridge chip, and a plurality of memories coupled to the CPU. A power supply unit (PSU) in a computer device provides the power for the motherboard system working normally through the power controller in the motherboard system.

A front-end detecting unit in the system (e.g., the motherboard system) is configured to detect a state of the system (e.g., ON state, OFF state) and send a state message corresponding to the state of the system in real-time. When the state of the system is ON state (i.e., the system is in a status having the power to operate.), the state message may reflect the state of the system as ON state. When the state of the system is OFF state (i.e., the system is in a status not having the power to operate.), the state message may reflect the state of the system as OFF state. The state message that reflects the state of the system as OFF state includes the following three circumstances: 1. The system is powered off in the way of normal procedure so that the path for providing the power form the power supply unit to the system is off normally; 2. A signal of the power supply unit in the system is erroneous so that the state of the system detected by the front-end detecting unit is OFF state; 3. The power source of the power supply unit is directly powered off (e.g., the power plug, connecting to the externally power, of the power supply unit is pulled) when the system is operating normally, and then the system is powered off because the power supply unit may not provide the power to the system.

Figure 1:
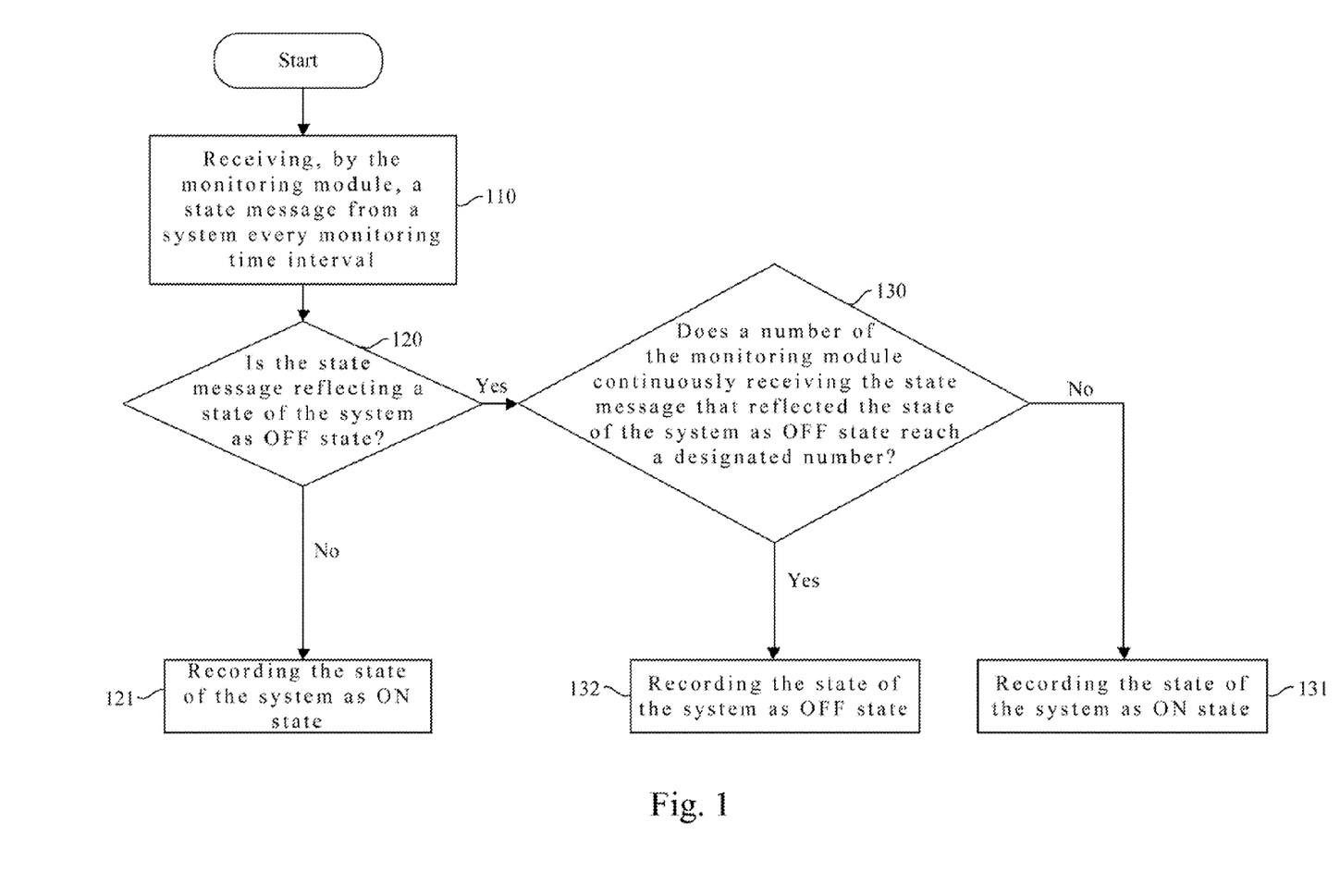
FIG. 1 is a flow chart of a monitoring method of a monitoring module according to an embodiment of the present invention.

FIG. 1 is a flow chart of a monitoring method of a monitoring module according to an embodiment of the present invention. As shown in FIG. 1, in step 110, the monitoring module receives a state message from a system every monitoring time interval, wherein the state message is configured to reflect a state of the system (e.g., ON state, OFF state). In an embodiment, the monitoring time interval is 25 ms, i.e., the monitoring module receives the state message from the system every 25 ms (i.e., 40 times per second).

In an embodiment, the monitoring module receives the state message through an interface of the system and then records the state of the system in a nonvolatile memory (e.g., EEPROM) of the monitoring module. The interface of the system may be a general purpose I/O (GM) interface. The monitoring module of the present invention may be set on the system or separated with the system. The monitoring module may receive the state message of the system every monitoring time interval no matter whether the monitoring module is set on the system.

In an embodiment, the monitoring module is a baseboard management controller (BMC). The BMC can control the system to start up (be ON state) and shut off (be OFF state). The BMC is included within an intelligent platform management Interface (IPMI), and it is a main controller in the IPMI. Furthermore, the BMC transmits signals to the other system modules (e.g., a south bridge chip, a hardware detection module, a power supply module, a sensor, a chipset, a slot for connecting to peripheral elements) that are included within the same IPMI via a bus so as to detect and record data in the other system modules that are included within the same IPMI.

In step 120, the monitoring module determines whether the state message received by the monitoring module reflects the state of the system as OFF state after receiving the state message reflecting the state of the system. When the state message received by the monitoring module does not reflect the state of the system as OFF state but ON state, the system operates normally. At this time, in step 121, the monitoring module records the state of the system as ON state.

Otherwise, when the state message received by the monitoring module reflects the state of the system as OFF state, the monitoring module does not record the state of the system as OFF state immediately but remains recording the state of the system as ON state and starts counting. Furthermore, the monitoring module counts one time once the monitoring module receives the state message reflecting the state of the system as OFF state. In an embodiment, the counting function of the monitoring module is a function module that is performed by codes encoded in the monitoring module.

In step 130, the monitoring module determines whether a number of the monitoring module continuously receiving the state message reflecting the state of the system as OFF state has reached a designated number. In an embodiment, the designated number is 160. The monitoring module received the state message by a frequency as 40 times per second and count. It is said that the number of the monitoring module counting reaches the designated number (i.e., 160) when a duration of the monitoring module continuously receiving the state message as OFF state has reached 4 seconds. In an embodiment, when the number of the monitoring module counting reaches the designated number, the number of the monitoring module counting may be reset, i.e., to return an initial counting number, wherein the initial counting number may be 0 or any number.

In an embodiment, the designated number may be set in the function module that is performed by codes encoded in the monitoring module. The three circumstances as mentioned previously may be distinguished based on whether the number of the monitoring module counting reaches the designated number. The details about the three circumstances will be expounded as the following embodiments.

In step 131, when the number of the monitoring module continuously receiving the state message reflecting the state of the system as OFF state has not reached the designated number, the monitoring module remains recording the state of the system as ON state.

The circumstance that the number of the monitoring module will not reached the designated number may happen in one of the latter two circumstances, i.e., the signal of the power supply in the system is erroneous so that the state of the system detected by the front-end detecting unit is OFF state, or the power source of the power supply is powered off when the system is operating normally.

If the duration of the erroneous signal is less than 4 seconds, the monitoring module may determine that the system still remains operating normally, and the monitoring module records the state of the system as ON state at this time. If the power source of the power supply unit is powered off by external when the system is operating normally, the power supply unit may not provide the power to the system. If the power source of the power supply is recovered within 4 seconds, the monitoring module remains recording the state of the system as ON state so that the system may automatically be recovered to the state at which the system is powered down, i.e., ON state, after the system is powered on.

Another situation is that the power source of the power supply is not recovered within 4 seconds. The system is powered off immediately because the system is powered down, but the speed of the monitoring module powered down (e.g., 1 second or a little longer) is much slower than the speed of the system powered down. Capacitors or other components of the sever discharged and may cause the monitoring module almost dead but not fully powered down, and the monitoring module still may record the state of the system as ON state and start counting for 1 second or a little longer. Before the counting number reaches the designated number 160, the monitoring module will stop counting due to the monitoring module is fully powered down. So when the monitoring module is fully powered down, the record of the state of the system recorded by the monitoring module is still ON state.

Once the power source of the power supply is powered on, the power supply may provide the power to the system and the monitoring module. The monitoring module may be powered on again. Because the monitoring module remains recording the state of the system as ON state, the monitoring module may control the system to be recovered to the state at which the system is powered down, i.e., ON state, after the system is powered on.

Furthermore, in step 132, when the number of the monitoring module continuously receiving the state message reflecting the state of the system as OFF state has reached the designated number, the monitoring module records the state of the system as OFF state. This circumstance is that the system is powered off in the way of normal procedure.

When the system is powered off in the way of normal procedure, the state message received by the monitoring module reflects the state of the system as OFF state. The monitoring module will record the state of the system as ON state and start counting. The system needs to spend some time to process the necessary procedures, e.g., trigger to power off, close the applications, close the operation system, and finally power off the path for providing the power to the system form the power supply. So, after the system is powered off in the way of normal procedure, the monitoring module will continuously receive the state message reflecting the state of the system as OFF state and once the number of the monitoring module continuously receiving the state message reflecting the state of the system as OFF state has reached the designated number 160, the monitoring module will record the state of the system as OFF state. After the system is powered off in the way of normal procedure, the system must be manually started up but will not be automatically powered on because the state of the system recorded by monitoring module is OFF state.

Figure 2:
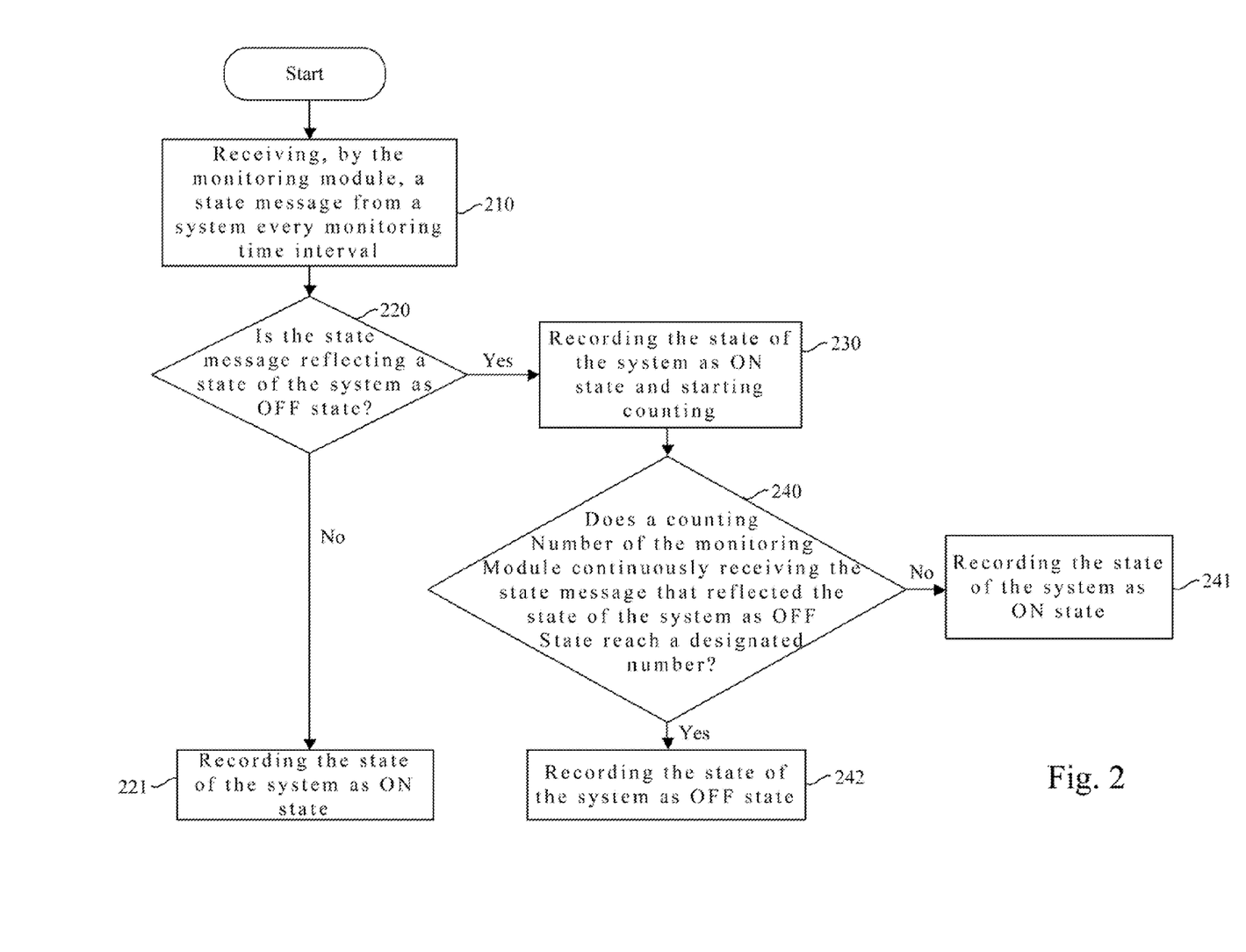
FIG. 2 is a flow chart of a monitoring method of a monitoring module according to another embodiment of the present invention.

FIG. 2 is a flow chart of a monitoring method of a monitoring module according to another embodiment of the present invention. As shown in FIG. 2, in step 210, the monitoring module receives a state message from a system every monitoring time interval, wherein the state message configured to reflect a state of the system. For example, the ON state message reflects the state of the system as ON state, and the OFF state message reflects the state of the system as OFF state. After the monitoring module receives the state message, in step 220, the monitoring module determines whether the state message received by the monitoring module is the OFF state message. When the state message received by the monitoring module is not the OFF state message but the ON state message, the system operates normally. At this time, in step 221, the monitoring module records the state of the system as ON state.

Otherwise, when the state message received by the monitoring module reflects the state of the system as OFF state, the monitoring module does not record the state of the system as OFF state immediately but remains recording the state of the system as ON state and starts counting in step 230. Furthermore, the monitoring module counts one time once the monitoring module receives the state message reflecting the state of the system as OFF state. In step 240, the monitoring module determines whether a number of the monitoring module continuously receiving the state message reflecting the state of the system as OFF state has reached a designated number.

In step 241, when the number of the monitoring module continuously receiving the state message reflecting the state of the system as OFF state has not reached the designated number, the monitoring module records the state of the system as ON state. This circumstance is that a signal of the power supply in the system is erroneous so that the state of the system detected by the front-end detecting unit is OFF state, or the power source of the power supply unit is directly powered off (e.g., the power plug, connecting to the externally power, of the power supply unit is pulled) when the system is operating normally, and then the system is powered off because the power supply unit may not provide the power to the system. Otherwise, another circumstance is that the monitoring module records the state of the system as OFF state when the number of the monitoring module continuously receiving OFF state message has reach the designated number in step 242. This circumstance is that the system is powered off in the way of normal procedure.

Figure 3:
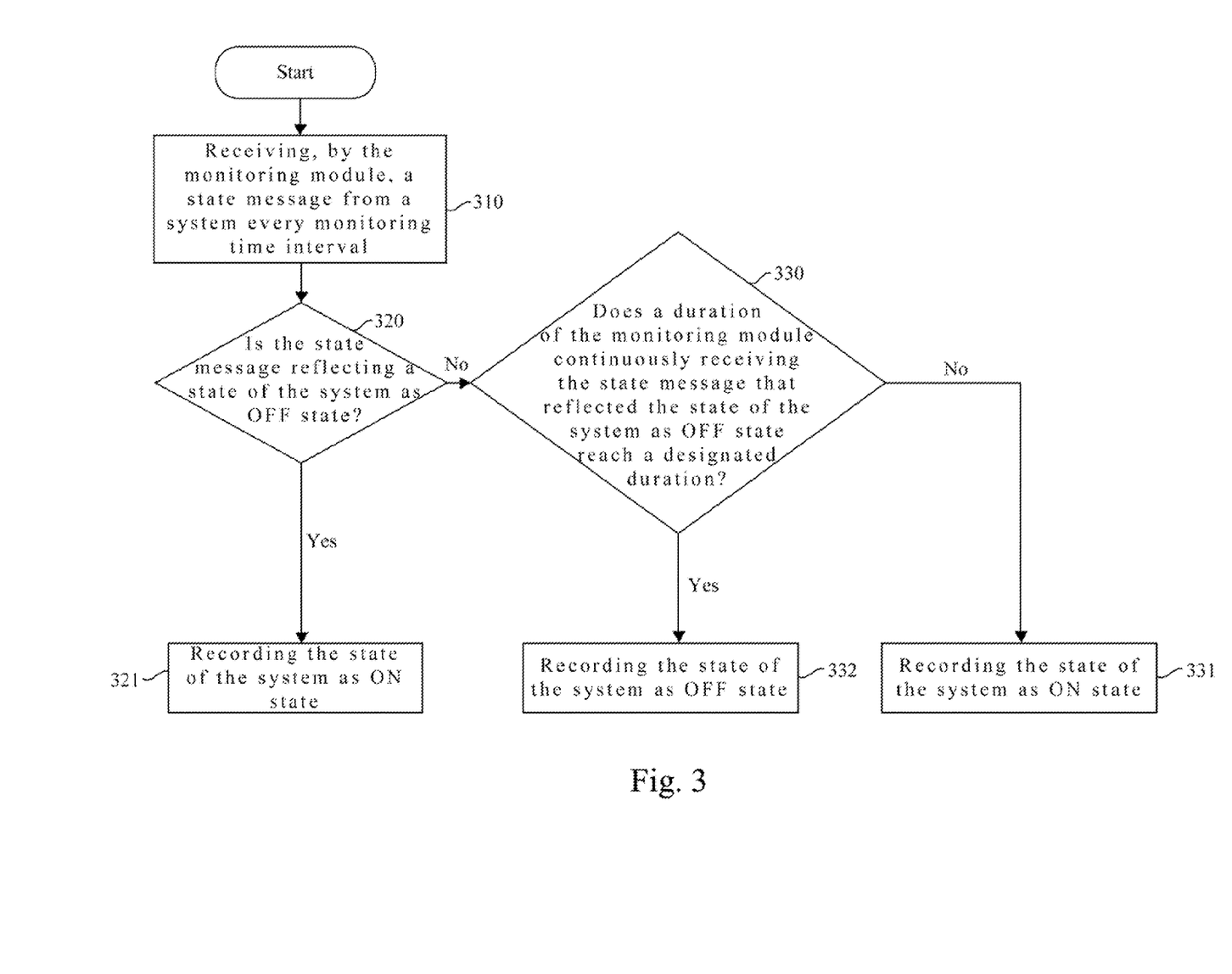
FIG. 3 is a flow chart of a monitoring method of a monitoring module according to yet another embodiment of the present invention.

FIG. 3 is a flow chart of a monitoring method of a monitoring module according to yet another embodiment of the present invention. As shown in FIG. 3, in step 310, the monitoring module receives a state message from a system every monitoring time interval, wherein the state message is configured to reflect a state of the system (e.g., ON state, OFF state). In an embodiment, the monitoring time interval is 25 ms, i.e., the monitoring module receives the state message from the system every 25 ms (i.e., 40 times per second).

In step 320, the monitoring module determines whether the state message received by the monitoring module reflects the state of the system as OFF state after receiving the state message. When the state message received by the monitoring module does not reflect the state of the system as OFF state but ON state, the system operates normally. At this time, in step 321, the monitoring module records the state of the system as ON state.

Otherwise, when the state message received by the monitoring module reflects the state of the system as OFF state, the monitoring module does not record the state of the system as OFF state immediately but remains recording the state of the system as ON state and starts counting. In step 330, the monitoring module determines whether a duration of the monitoring module continuously receiving the state message reflecting the state of the system as OFF state has reached a designated duration. In an embodiment, the designated duration is 4 seconds.

In step 331, when the duration of the monitoring module continuously receiving the state message reflecting the state of the system as OFF state has not reached the designated duration, the monitoring module remains recording the state of the system as ON state. The circumstance may happen in that the signal of the power supply in the system is erroneous so that the state of the system detected by the front-end detecting unit is OFF state, or the power source of the power supply is directly powered off externally e.g., the power plug, connecting to the externally power, of the power supply unit is pulled) when the system is operating normally, so that the system is powered off because the power supply may not provide the power to the system.

Otherwise, in step 332, when the number of the monitoring module continuously receiving the state message reflecting the state of the system as OFF state has reached the designated duration, the monitoring module records the state of the system as OFF state. This circumstance is that the system is powered off in the way of normal procedure.

Figure 4:
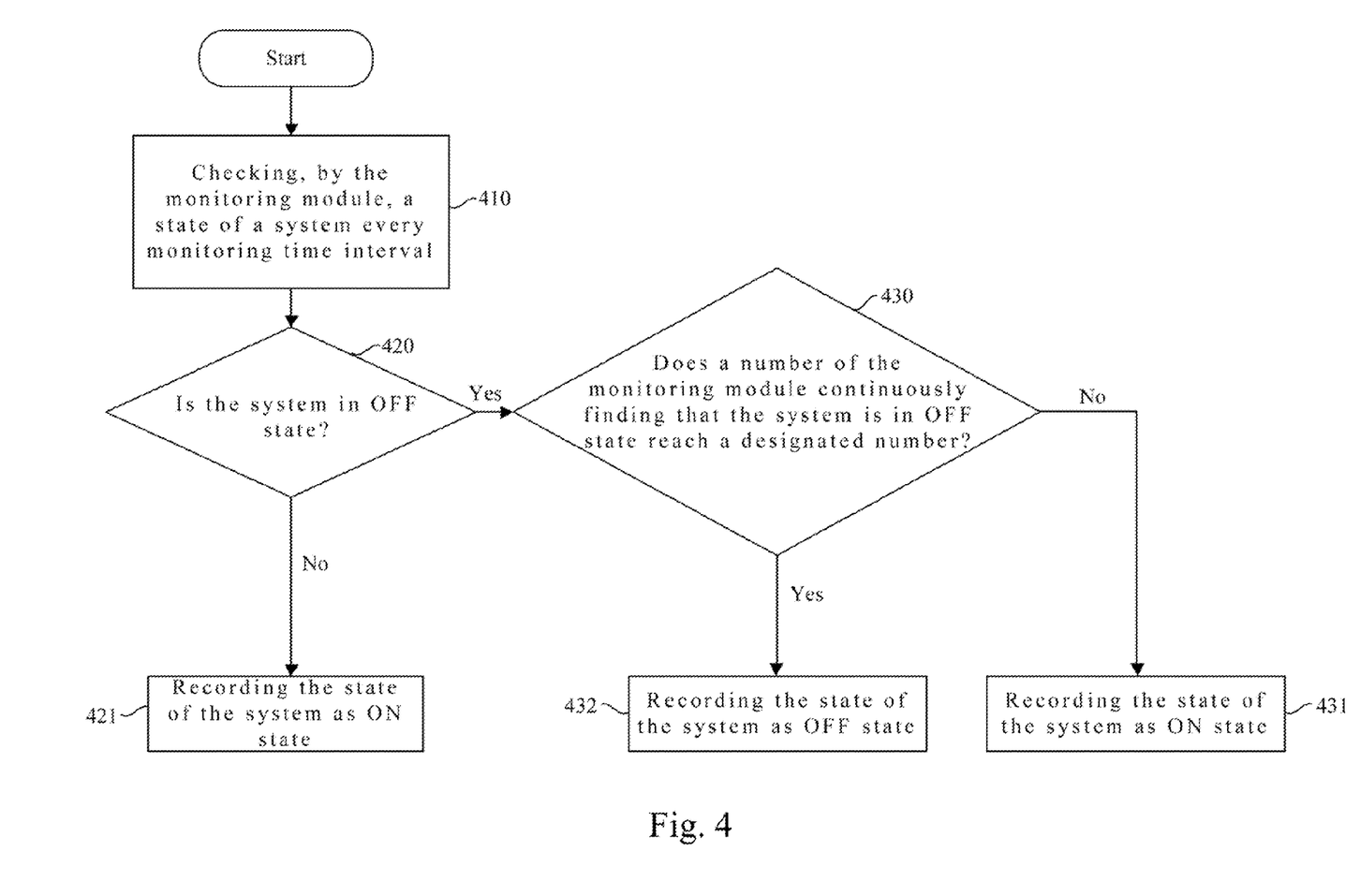
FIG. 4 is a flow chart of a monitoring method of a monitoring module according to further embodiment of the present invention.

FIG. 4 is a flow chart of a monitoring method of a monitoring module according to further embodiment of the present invention. As shown in FIG. 4, in step 410, the monitoring module checks a state (e.g., ON state, OFF state) of a system every monitoring time interval. In an embodiment, the monitoring time interval is 25 ms, i.e., the monitoring module checks the state of the system every 25 ms (i.e., 40 times per second).

In step 420, the monitoring module determines whether the state of the system is in OFF state (i.e., the system is in a status not having the power to operate.) after checking the state of the system. When the state of the system checked by the monitoring module is not in OFF state but in ON state (i.e., the system is in a status having the power to operate.), the system operates normally. At this time, in step 421, the monitoring module records the state of the system as ON state.

Otherwise, when the state of the system checked by the monitoring module is in OFF state, the monitoring module does not record the state of the system as OFF state immediately but remains recording the state of the system as ON state and starts counting. In step 430, the monitoring module determines whether a number of the monitoring module continuously finding that the system is in OFF state reaches a designated number. In an embodiment, the designated number is 160.

In step 431, when the number of the monitoring module continuously finding that the system is in OFF state does not reach the designated number, the monitoring module remains recording the state of the system as ON state. The circumstance may happen in that the signal of the power supply in the system is erroneous so that the state of the system detected by the front-end detecting unit is OFF state, or the power source of the power supply is directly powered off externally (e.g., the power plug, connecting to the externally power, of the power supply unit is pulled) when the system is operating normally, so that the system is powered off because the power supply may not provide the power to the system.

Otherwise, in step 432, when the number of the monitoring module continuously finding that the system is in OFF state reaches the designated number, the monitoring module records the state of the system as OFF state. This circumstance is that the system is powered off in the way of normal procedure.

In summary, when the state message received by the monitoring module is the OFF state message, especially the power source of the power supply unit is powered off externally (e.g., the power plug, connecting to the externally power, of the power supply unit is pulled) when the system is operating normally, so that the system is powered off. The number of the monitoring module continuously receiving the OFF state message reflected the state of the system as OFF state has not reached the designated number or the duration, the monitoring module remains recording the state of the system as ON state. Therefore, the system may automatically be recovered to the state at which the system is powered down, i.e., ON state, when the power supply unit is powered on again.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A monitoring method of a monitoring module, which is applied to a server that comprises the monitoring module, a front-end detecting unit and a system, comprising:
   detecting a state of the system and sending a state message corresponding to the state of the system in real-time by the front-end detecting unit;
   receiving, by the monitoring module, the state message from the front-end detecting unit every monitoring time interval;
   recording the state of the system as ON state when a number of the monitoring module continuously receiving the state message reflecting the state of the system as OFF state does not reach a designated number; and
   recording the state of the system as OFF state when the number of the monitoring module continuously receiving the state message reflecting the state of the system as OFF state reaches the designated number.

2. The monitoring method of claim 1, further comprising:
   recording the state of the system as ON state when the state message received by the monitoring module reflects the state of the system as ON state.

3. The monitoring method of claim 1, wherein the monitoring module is a baseboard management controller (BMC).

4. The monitoring method of claim 1, wherein the system is a motherboard system, and the motherboard system further comprises a central processing unit (CPU) disposed on a motherboard, and a plurality of memories coupled to the CPU.

5. The monitoring method of claim 1, wherein the monitoring module receives the state message through an interface of the system.

6. The monitoring method of claim 5, wherein the interface is a general purpose I/O (GPIO) interface.

7. The monitoring method of claim 1, wherein the monitoring time interval is 25 ms, and the designated number is 160.

8. The monitoring method of claim 1, further comprising:
the monitoring module recording the state of the system as ON state and starting counting when the monitoring module receives the state message reflecting the state of the system as OFF state.

9. A monitoring method of a monitoring module, which is applied to a server that comprises the monitoring module, a front-end detecting unit and a system, comprising:
detecting a state of the system and sending a state message corresponding to the state of the system in real-time by the front-end detecting unit;
receiving, by the monitoring module, the state message from the front-end detecting unit every monitoring time interval and recording the state of the system;
recording the state of the system as ON state when a duration of the monitoring module continuously receiving the state message reflecting the state of the system as OFF state does not reach a designated duration; and
recording the state of the system as OFF state when the duration of the monitoring module continuously receiving the state message reflecting the state of the system as OFF state reaches the designated duration.

10. The monitoring method of claim 9, wherein the monitoring time interval is 25 ms, and the designated duration is 4 s.

11. A monitoring method of a monitoring module, which is applied to a server that comprises the monitoring module, a front-end detecting unit and a system, comprising:
detecting a state of the system and sending a state message corresponding to the state of the system in real-time by the front-end detecting unit;
checking, by the monitoring module, the state of the front-end detecting unit every monitoring time interval;
recording the state of the system as ON state when a number of the monitoring module continuously finding that the system is in OFF state does not reach a designated number; and
recording the state of the system as OFF state when the number of the monitoring module continuously finding that the system is in OFF state reaches the designated number.

12. The monitoring method of claim 11, further comprising:
recording the state of the system as ON state when the monitoring module finding that the system is in ON state.

13. The monitoring method of claim 11, wherein the monitoring module is a baseboard management controller (BMC).

14. The monitoring method of claim 11, wherein the system is a motherboard system, and the motherboard system further comprises a central processing unit (CPU) disposed on a motherboard, and a plurality of memories coupled to the CPU.

15. The monitoring method of claim 11, wherein the monitoring time interval is 25 ms, and the designated number is 160.

16. The monitoring method of claim 11, further comprising:
the monitoring module recording the state of the system as ON state and starting counting when the monitoring module finding that the system is in OFF state.

* * * * *